(12) United States Patent
O'Sullivan et al.

(10) Patent No.: US 9,331,971 B2
(45) Date of Patent: *May 3, 2016

(54) MESSAGE SUBSCRIPTION BASED ON MESSAGE AGGREGATE CHARACTERISTICS

(71) Applicant: International Business Machines Corporation, Armonk, NY (US)

(72) Inventors: Patrick J O'Sullivan, Dublin (IE); Fred Raguillat, Meath (IE); Edith H Stern, Yorktown Heights, NY (US); Barry E Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/213,811

(22) Filed: Mar. 14, 2014

(65) Prior Publication Data

US 2014/0201298 A1    Jul. 17, 2014

Related U.S. Application Data

(63) Continuation of application No. 13/570,505, filed on Aug. 9, 2012.

(51) Int. Cl.
  *G06F 15/16*    (2006.01)
  *H04L 12/58*    (2006.01)
  *G06F 17/30*    (2006.01)

(52) U.S. Cl.
  CPC .......... *H04L 51/10* (2013.01); *G06F 17/30867* (2013.01)

(58) Field of Classification Search
  CPC ........................................................ H04L 51/10
  USPC ................................... 709/206, 207; 707/727
  See application file for complete search history.

(56) References Cited

U.S. PATENT DOCUMENTS

| | | | |
|---|---|---|---|
| 6,728,715 B1 | 4/2004 | Astley et al. | |
| 6,976,082 B1 * | 12/2005 | Ostermann et al. | 709/231 |
| 7,293,038 B2 | 11/2007 | Blevins et al. | |
| 7,401,119 B2 | 7/2008 | Graham et al. | |
| 7,847,260 B2 | 12/2010 | Inbar | |
| 8,442,994 B1 * | 5/2013 | Chen | G06F 17/30864 707/711 |
| 2002/0164977 A1 | 11/2002 | Link, II et al. | |
| 2004/0254993 A1 * | 12/2004 | Mamas | 709/206 |
| 2008/0005086 A1 * | 1/2008 | Moore | 707/3 |
| 2008/0134202 A1 | 6/2008 | Craggs et al. | |
| 2008/0256553 A1 * | 10/2008 | Cullen | 719/313 |
| 2009/0112834 A1 | 4/2009 | Cordes et al. | |

(Continued)

FOREIGN PATENT DOCUMENTS

| | | |
|---|---|---|
| CN | 1572098 A | 1/2005 |
| CN | 101808002 A | 8/2010 |

*Primary Examiner* — David Lazaro
*Assistant Examiner* — Marie Georges Henry
(74) *Attorney, Agent, or Firm* — Jeffrey T. Holman (57) ABSTRACT

A method for message subscription based on a message aggregate characteristic is described. The method includes receiving a message subscription from a user. The message subscription is based on the message aggregate characteristic including an aspect other than textual content and bibliographic content. The method also includes determining a published message in response to receiving the message subscription. The published message satisfies the message aggregate characteristic. The method also includes providing an indication of the published message to the user.

11 Claims, 4 Drawing Sheets

(56) References Cited

U.S. PATENT DOCUMENTS

| | | |
|---|---|---|
| 2009/0156170 A1* | 6/2009 | Rossano et al. ............ 455/412.1 |
| 2009/0182742 A1 | 7/2009 | Stewart et al. |
| 2010/0064007 A1 | 3/2010 | Randall |
| 2010/0083124 A1* | 4/2010 | Druzgalski et al. ........... 715/738 |
| 2010/0179996 A1* | 7/2010 | Jones et al. ................... 709/206 |
| 2011/0219094 A1 | 9/2011 | Turakhia |
| 2011/0258268 A1* | 10/2011 | Banks et al. .................. 709/206 |

* cited by examiner

MESSAGE SUBSCRIPTION BASED ON MESSAGE AGGREGATE CHARACTERISTICS

CROSS-REFERENCE TO RELATED APPLICATIONS

This application is a continuation of U.S. application Ser. No. 13/570,505, filed on Aug. 9, 2012, which is incorporated by reference herein in its entirety.

BACKGROUND

Electronic communications may be delivered through a variety of methods, and to different numbers of recipients. One-to-one methods include synchronous methods, such as voice telephony, and asynchronous methods, such as email. One-to-many methods include various message publishing models, such as broadcast or publish-subscribe approaches. Messages may be viewed over a web browser or other application on different kinds of electronic devices. Additionally, recipients may subscribe to many of the different publishing models to automatically receive messages of a certain type, such as articles or emails, through a subscription service.

Increasing connectivity to the growing amount of varied electronic data drives a need for flexibility in subscriptions for desired content. Improving the ways in which users are able to specify what they want allows them to receive data more closely suited to their personal preferences, and to filter the ever increasing amount of available data to the most relevant content.

SUMMARY

Embodiments of a method are described. In one embodiment, the method is a method for message subscription based on a message aggregate characteristic. The method includes receiving a message subscription from a user. The message subscription is based on the message aggregate characteristic including an aspect other than textual content and bibliographic content. The method also includes determining a published message in response to receiving the message subscription. The published message satisfies the message aggregate characteristic. The method also includes providing an indication of the published message to the user. Other embodiments of the method, a system, and a computer program product are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a system and method for message subscription based on a message aggregate characteristic. More specifically, the system allows users to create message subscriptions based on a message aggregate characteristic that has at least one aspect other than textual and biographical information. In some embodiments, the message aggregate characteristics may be used in conjunction with textual or biographical information to determined published messages that fit criteria specified by a user.

Conventional subscriptions typically rely on keyword subscriptions or subscriptions based on an originator of the messages. The keywords typically include a topic related to the message or a word used in the message. The originator may define a source of the message. Subscriptions based on textual or biographical information may be useful for obtaining messages by topic keyword or from a specific source that may typically provide content in which the user may be interested, but may be limited in the flexibility that some users may desire. Such subscriptions often include messages in which the user may not be interested.

Consequently, a system and method that allows users to customize message subscriptions based on message aggregate characteristics that represent aspects of the messages other than topical keyword or originator characteristics provides greater flexibility to the users, and may provide messages more specifically tailored to the preferences of the users. For example, such a system allows users to subscribe to messages directed to certain demographics, topics generated from within a specified distance of a location that is specified in the message subscription, and other such message aggregate characteristics.

Figure 1:
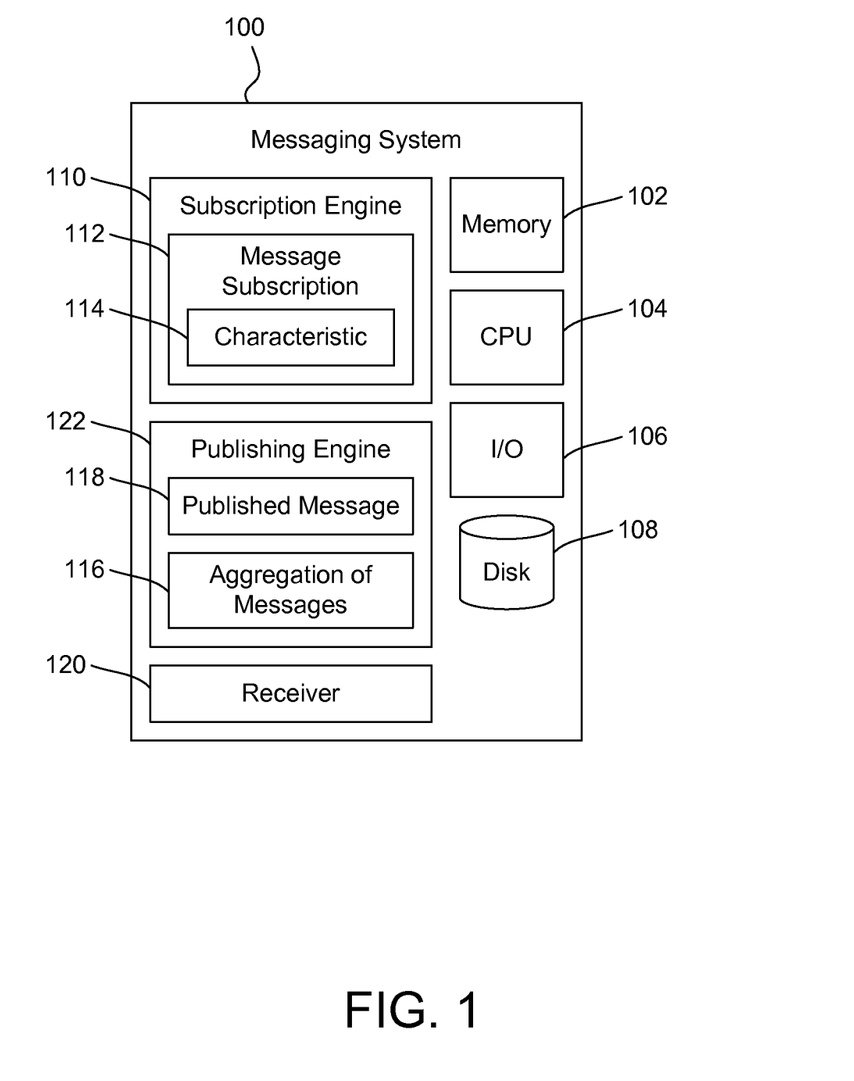
FIG. 1 depicts a schematic diagram of one embodiment of a messaging system.
Figure 4:
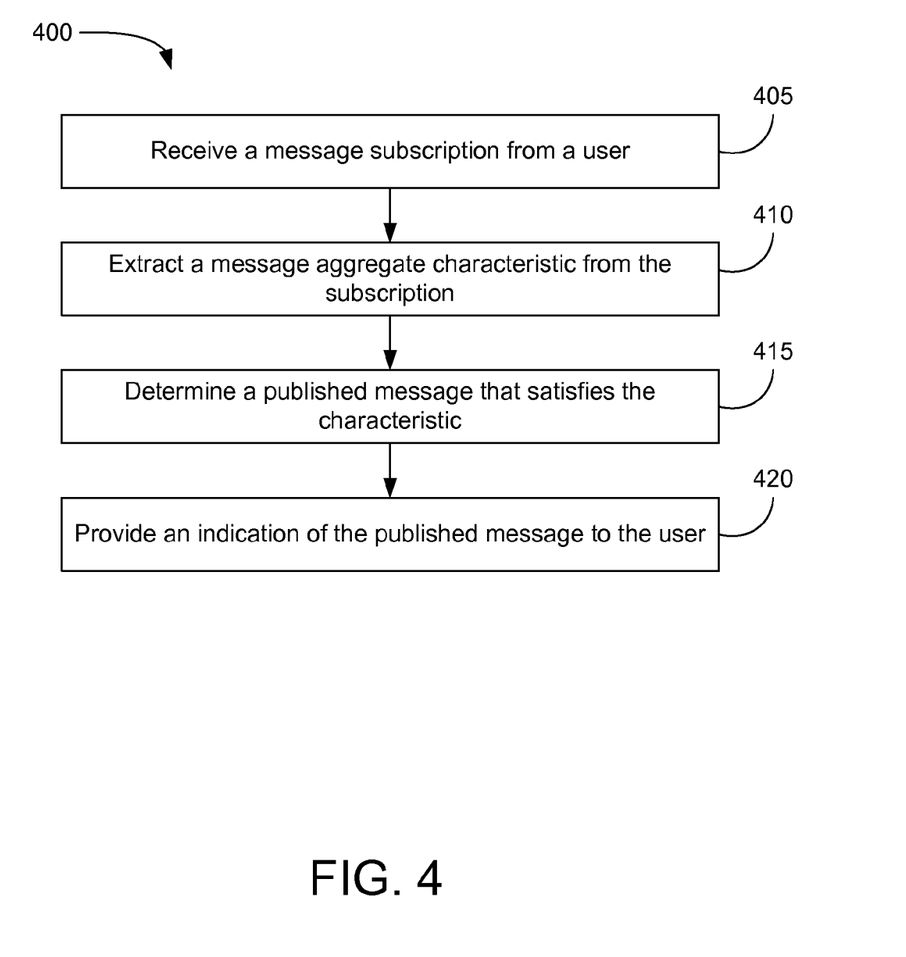
FIG. 4 depicts a flowchart diagram of one embodiment of a method for message subscription based on a message aggregate characteristic.

FIG. 1 depicts a schematic diagram of one embodiment of a messaging system 100. The depicted messaging system 100 includes various components, described in more detail below, that are capable of performing the functions and operations described herein. In one embodiment, at least some of the components of the messaging system 100 are implemented in a computer system. For example, the functionality of one or more components of the messaging system 100 may be implemented by computer program instructions stored on a computer memory device 102 and executed by a processing device 104 such as a CPU. The messaging system 100 may include other components, such as input/output devices 106, a disk storage drive 108, a subscription engine 110, a publishing engine 122, and a receiver 120. Some or all of the components of the messaging system 100 may be stored on a single computing device 104 or on a network of computing devices 104, including a wireless communication network. The messaging system 100 may include more or fewer components or subsystems than those depicted herein. In some embodiments, the messaging system 100 may be used to implement the methods described herein as depicted in FIG. 4.

A user may generate a message subscription 112 to receive messages 118 relevant to a user's interests or preferences from a publishing engine 122. The messages 118 may include all published messages from a corpus of messages which may include one or more types of messages from the publishing engine 122, including articles, text messages, synopses of messages, and other types. The messaging system 100 may include a receiver 120 to receive the subscription from the user. The subscription may be stored on a memory device 102 on a computing device such as a server. The server may manage subscriptions for many users. In some embodiments, the corpus of messages 118 may be stored on a network of computing devices. In other embodiments, the corpus of messages 118 may be stored on multiple networks or connected computing devices such as the Internet.

When the messaging system 100 attempts to determine a published message 118 to send to the user, the messaging system 100 may pull the corpus of messages 118 from one or more sources. In one embodiment, the messaging system 100 receives a published message 118 and determines if the published message 118 matches the subscription. This may be done at a client-side broker or at a broker close to the user. Some of the operations of the messaging system 100 may occur at different locations within the messaging system 100.

In other embodiments, the messaging system 100 may search for published messages 118 to send to the user at any time. For example, the messaging system 100 may search for messages 118 when the subscription is first created. The messaging system 100 may search for messages 118 at specified time intervals. The messaging system 100 may search for messages 118 to send to the user when the messaging system 100 receives new messages 118 from any source. In other embodiments, the messaging system 100 may determine published messages 118 to send to the user at other times or in other configurations.

The user may select one or more message characteristics 114 for the subscription. The characteristics 114 may determine certain aspects of the messages 118 to be retrieved for the user. In one embodiment, the subscription includes at least one characteristic 114 that does not represent an originator of the messages 118 or keyword in the messages 118, though the subscription may also include one or more characteristic 114 that does represent an originator of the messages 118 or keywords in the messages 118.

In one embodiment, the messaging system 100 maintains summary data associated with a limited set of possible subscriptions 112 for a user. For example, the messaging system 100 may support a large, but limited, number of possible ways to subscribe, which may be organized into logical "buckets." When the messaging system 100 receives a new published message 118, the messaging system 100 checks the summary data associated with each of the buckets and selects the bucket satisfied by the published message 118. The messaging system 100 then delivers the published message 118 to each user that has specified the corresponding subscription criteria from the satisfied bucket according to the users' subscriptions 112.

The message characteristics 114 associated with a given published message 118 may be based on a comparison of the published message 118 to other messages 118 in an aggregation 116 of messages 118. The aggregation 116 of messages 118 may be included in the corpus of messages 118. The published message 118 may share at least one characteristic 114 with some or all of the other messages 118 in the aggregation 116 of messages 118 and may have at least one different characteristic 114 than some or all of the messages 118 in the aggregation 116 of messages 118.

Figure 2:
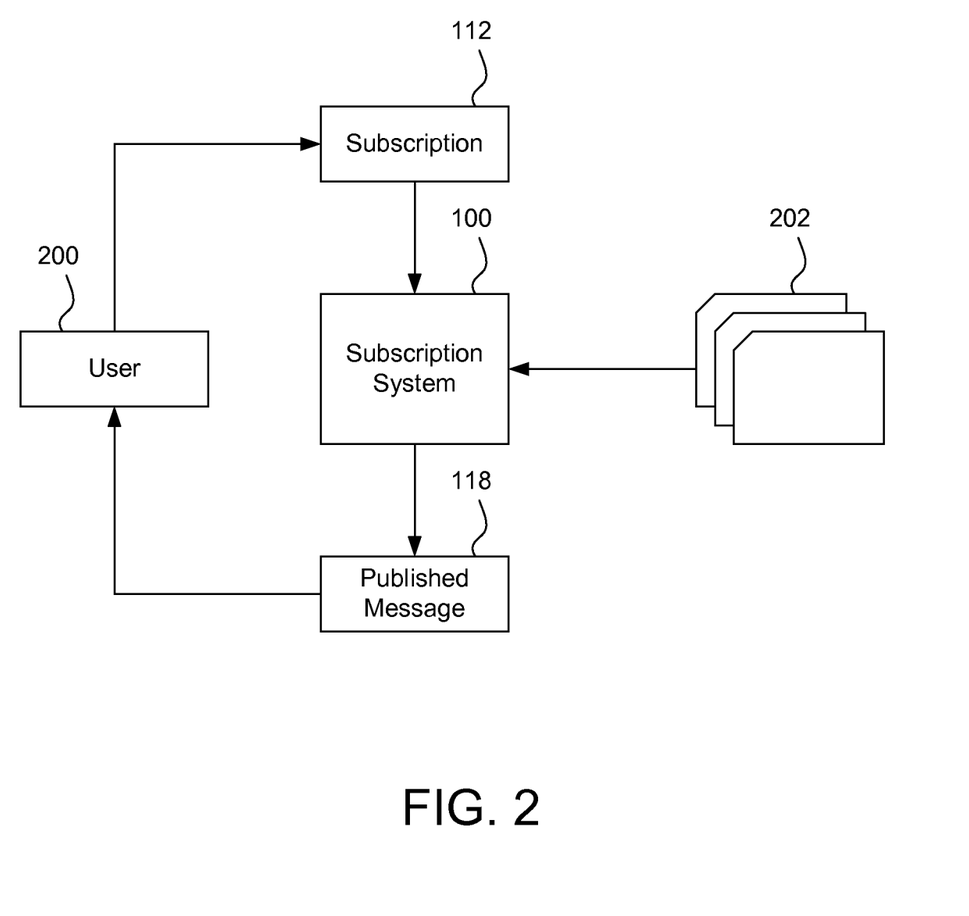
FIG. 2 depicts a flowchart diagram of one embodiment of the operations of the messaging system of FIG. 1.

FIG. 2 depicts a flowchart diagram of one embodiment of the operations of the messaging system 100 of FIG. 1. The user 200 may create a message subscription 112 via a web page, an application or other interactive mechanism. The message subscription 112 may be for any articles or other messages 118 that may be available in any publish-subscribe system. The messaging system 100 may be used in conjunction with any number of different message providers, such that the user 200 may receive published messages 118 in various formats from many different sources.

In one embodiment, the subscription engine 110 is configured to receive the message subscription 112 associated with the user 200. The message subscription 112 may be used to determine published messages 118 to send to the user 200. In some embodiments, the published messages 118 may be selected from a large corpus 202 of messages 118. The message subscription 112 may select the messages 118 based on criteria associated with the message subscription 112 and specified by the user 200. Each of the selected messages 118 may satisfy at least one criterion of the message subscription 112.

The criteria may include a message aggregate characteristic 114 that relates to one or more aspects of an aggregation 116 of messages 118. The characteristic 114 may be any characteristic 114 which can be determined by evaluation of the aggregation 116 of messages 118, such that any published messages 118 selected by the messaging system 100 to satisfy the message subscription 112 have the message aggregate characteristic 114. One example of a message aggregate characteristic 114 includes published messages that are related to topics with highest activity within a specified locale, messages with heavy emotional content, messages related to topics within a specified demographic, and other characteristics that may be based on a comparison of the published messages 118 to other messages. In some embodiments, the message aggregate characteristics 114 are determined based on certain aspects of messages relative to a group of messages, such that the comparison determines the message aggregate characteristics 114.

The user 200 may select parameters expressing the characteristic 114 or characteristics 114 via a template or default choices, pull down menu choices, check boxes or other selection mechanism. In some embodiments, the user 200 may also type in a parameter for a given characteristic 114. A service providing the subscription may automatically subscribe the user 200 to one or more topics of interest for the user 200 based on information gathered from or about the user 200.

The subscription may be all or partially imported; for example, the subscription may include corporate template additions that include enterprise and non-enterprise elements. In one embodiment, an enterprise may provide a template for employees that enable the employees to track relevant messages 118 about customers, products, weather, etc., and may provide this to a public service provider. The subscription may be generated using a template that includes default characteristics 114 or preferences which may be modified by the user 200 to customize the subscription to the user's preferences.

When the messaging system 100 receives the message subscription 112 associated with the user 200, the messaging system 100 may store the subscription on a local storage device, such as a memory device 102. The messaging system 100 may then perform a search across a corpus 202 of published messages 118 for messages 118 that have characteristics 114 that satisfy the subscription. The corpus 202 may include any number and/or type of messages 118, and may be obtained from any source that contains published messages 118. In some embodiments, messages 118 may be determined to have the characteristic 114 of the subscription by comparing the messages 118 against the corpus 202 or other aggregation 116 of messages 118.

When the subscription has determined at least one published message 118 from the corpus 202 of messages 118 that satisfies the characteristic 114, the messaging system 100 may then send an indication of the published message 118 to the user 200. The indication of the published message, in some embodiments, may include a link to the published message 118. In other embodiments, the indication of the published message 118 may also include all or at least some of the content of the published message, such as a synopsis of the published message 118. The messaging system 100 may push the message 118 to the user 200 via an electronic message delivery service—such as email, short message service, or voice transcriptions—or allow the user 200 to pull the message 118 by logging in to a web site, for example. Other methods of providing an indication of the published message 118 or of providing the published message 118 may be used.

In one embodiment, the messaging system 100 may include a central or distributed mechanism to determine whether the subscription is fulfilled. A centralized mechanism may analyze message distribution and characteristics 114 that may satisfy permitted subscription categories. When a message 118 is determined to fulfill a given allowed subscription category, a determination of whether the user 200 is to receive the message 118 may be done at a receiving broker, a sending broker, a centralized server, or at a client.

Figure 3:
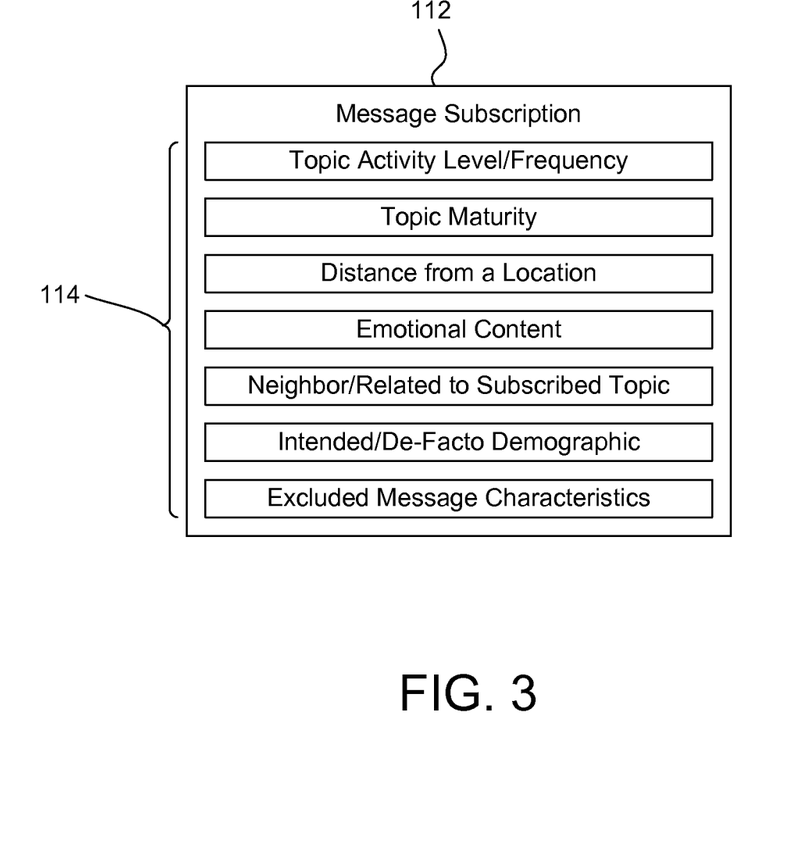
FIG. 3 depicts a schematic diagram of one embodiment of a message subscription.

FIG. 3 depicts a schematic diagram of one embodiment of a message subscription 112. In one embodiment, the message subscription 112 includes at least one message aggregate characteristic 114. The user 200 may select one or more message aggregate characteristics 114 to associate with the message subscription 112. The message aggregate characteristic 114 may be a characteristic 114 related to one of several different aspects of a message 118 or aggregation 116 of messages 118. In various embodiments, the message aggregate characteristic 114 is a characteristic 114 related to non-textual and non-bibliographical content of the message, though the message subscription 112 may also include criteria related to textual and/or bibliographical content in addition to the message aggregate characteristic 114.

In one embodiment, the message aggregation characteristic 114 relates to a topic activity level or frequency. The characteristic 114 may describe a frequency of the topic activity within a geographical area, a desired level of topic activity within a specified demographic, a desired level of topic activity within a specified user centric network graph, or a desired amount of activity for generating messages 118 that are associated with the topic within a geographical area. Other embodiments may include other types of characteristics 114 related to a topic activity level or frequency.

The message aggregate characteristic 114 may relate to a topic maturity. For example, the characteristic 114 may describe a desired length of activity for a given topic or a desired level of search activity for the topic. The length of activity for the topic may be determined based on when messages 118 for the topic began publishing or some other event related to the topic. The search activity may be determined based a number of keyword searches for the topic or a number of subscriptions containing the topic keyword. The user 200 may input a threshold level for the search activity or length of activity.

The message aggregate characteristic 114 may relate to a geographical source or location. For example, the characteristic 114 may be related to topics generated from within a specified distance of a location that is specified in the message subscription 112 or topics from within a specific location and a given demographic. This may allow the user 200 to receive messages 118 that are generated within a specified distance of a selected city, for example.

The message aggregate characteristic 114 may relate to an emotional tone of the messages 118. For example, the user 200 may subscribe to messages 118 that have an indication of high emotional content. The level of emotional content may be determined using various text analysis processes that are able to interpret the tone of the content.

The message aggregate characteristic 114 may include an indication of relevance or relation to another topic that is currently under subscription. The user 200 may subscribe to messages 118 related to topics that are the nearest neighbors of a topic that is currently under subscription or messages 118 having keywords that often appear in messages 118 associated with subscription topics. For example, the user 200 may automatically subscribe to messages 118 related to a specific city as well as messages 118 related to a specific topic when it is determined that the specific city and specific topic are neighbors of another topic under subscription. In another example, the user 200 may automatically subscribe to messages 118 related to popular astronomical topics as well as messages 118 related to specific topics that are determined to be related to the original subscription 112—e.g. messages related to popular astrophysics topics.

The message aggregate characteristic 114 may relate to an intended or de-facto demographic. For example, the characteristic 114 may describe messages 118 directed to a specific age demographic, occupational demographic, interest demographic or any type of demographic or combination of demographics. The demographic for a given message 118 may be determined based on the content of the message, or the demographic may be determined based on subscription or viewing activity for the given message 118.

The message aggregate characteristic 114 may also include an indication of message 118 or message characteristics 114, such as specific topics or keywords, to exclude from the subscription. For example, if the characteristic 114 includes an indication to exclude the keywords "financial planning" from the subscription, any messages 118 including the specified keywords are not sent to the user 200. The characteristic 114 may exclude information related to other characteristics 114, such as those described herein. For example, the user 200 may define the characteristic 114 to exclude messages 118 directed to a specific demographic, messages 118 with a certain level or tone of emotional content, messages 118 with a certain level of topic maturity or frequency, or other characteristics 114. The message aggregate characteristic 114 may include indications of other or additional non-textual and non-bibliographical characteristics 114 than are described herein.

FIG. 4 depicts a flowchart diagram of one embodiment of a method 400 for message subscription 112 based on a message aggregate characteristic 114. Although the method 400 is described in conjunction with the messaging system 100 of FIG. 1, the method 400 may be used in conjunction with any type of messaging system 100.

The messaging system 100 is configured to receive 405 a message subscription 112 from a user 200. The message subscription 112 is based on at least one message aggregate characteristic 114 that includes an aspect other than textual content and bibliographic content. The messaging system 100 is configured to extract 410 the characteristic 114 from the subscription 112 so that the messaging system 100 may fulfill the criteria associated with the subscription 112.

In one embodiment, the message aggregate characteristic 114 includes an indication of frequency and/or an indication of maturity of a topic for an aggregation 116 of published messages 118. The frequency may be based on an activity level of the published messages 118 in the aggregate which are related to the topic. The maturity may be based on an activity time length of the published messages 118 in the aggregate which are related to the topic. In one embodiment, the message aggregate characteristic 114 includes a post-publication aspect of the aggregate. The post-publication aspect corresponds to data that is collected for the aggregation 116 of messages 118 after the aggregation 116 of messages 118 is published. In one embodiment, the message aggregate characteristic 114 includes at least one of a topic generated from within a specified distance of a location that is specified in the message subscription 112, an aspect related to a currently subscribed topic, a demographic among which the published message 118 has a subscription volume above a subscription threshold, an indication of an emotional aspect of the published message, and an indication of an aspect of a published message 118 to exclude from the message subscription 112.

The messaging system 100 determines 415 at least one published message 118 in response to receiving the message subscription 112. The published message 118 satisfies the one or more message aggregate characteristics 114 associated with the message subscription 112. In one embodiment, the messaging system 100 determines a plurality of published messages 118 that satisfy the message aggregate characteristic 114.

The messaging system 100 may select a predetermined number of the published messages 118 according to a message scoring system to determine which messages 118 to provide to the user 200. For example, the messaging system 100 may determine the top ten messages 118 from the published messages 118 that satisfy the message aggregate characteristic 114 (e.g., messages 118 within ten miles of a specific geographical area) to provide to the user 200. In one embodiment, the location is defined by reference to a fixed spatial grid or to existing systems (e.g., the zip code system). The location may be enhanced by aggregating messages 118 from within the pre-specified distance.

Once a message 118 is determined to satisfy the characteristic 114, a determination of whether the user 200 is to receive the message 118 may be done at a receiving broker, a sending broker, a centralized server or at a client. In another embodiment, messages 118 are scored as they are delivered to determine whether they contribute to a permitted subscription category. This may be aggregated to a list containing the message identification, subscription category, and delivery status. The selected number of top messages 118 may then be sent to those that have subscribed to the category by the receiving or sending broker, the centralized server, or at the client. More complex subscription categories may include message topics gaining fastest in popularity, publishers gaining fastest in popularity, or other categories that may use various algorithms for determining which messages 118 to send to the user 200.

When the messaging system 100 has determined one or more published messages 118 that satisfy the message aggregate characteristic 114 of the message subscription 112, and which messages 118 of those that satisfy the characteristic 114 are to be sent to the user 200, the messaging system 100 provides 420 an indication of the published message 118 to the user 200. This may include sending a notification with a link to the message, sending a copy of the message 118 directly to the user 200, or any type of indication of the published message 118 that allows the user 200 to see or access the published message 118. In one embodiment, the messaging system 100 provides the indication of the published message 118 by automatically pushing the published message 118 to the user 200 via an electronic delivery system. In one embodiment, the subscription provides the indication of the published message 118 by providing the published message 118 in response to receiving a pull request from the user 200, for example via a web interface.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

An embodiment of a messaging system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for message subscription based on a message aggregate characteristic, the method comprising:
   receiving a message subscription from a user, wherein the message subscription is based on the message aggregate characteristic comprising an aspect other than textual content and bibliographic content;
   performing a search across a corpus of messages for messages that satisfy the message aggregate characteristic after receiving the message subscription and determining a published message in response to receiving the message subscription, wherein the published message satisfies the message aggregate characteristic, wherein the message aggregate characteristic relates to an aspect of an aggregation of messages and the published message is determined from a comparison of the published message to other messages in the aggregation of messages, wherein the message aggregate characteristic comprises an indication of frequency of a topic for the aggregation of messages, wherein the frequency is based on an activity level of the messages in the aggregate which are related to the topic; and
   providing an indication of the published message to the user.

2. The method of claim 1, wherein the message aggregate characteristic comprises an indication of maturity of a topic for an aggregate of published messages, wherein the maturity is based on an activity time length of the published messages in the aggregate which are related to the topic.

3. The method of claim 1, wherein the message aggregate characteristic comprises at least one of:
   a topic generated from within a specified distance of a location that is specified in the message subscription;
   an aspect related to a currently subscribed topic;
   a demographic among which the published message has a subscription volume above a subscription threshold;
   an indication of an emotional aspect of the published message; and
   an indication of an aspect of a published message to exclude from the message subscription.

4. The method of claim 1, wherein determining the published message further comprises:
   determining a plurality of published messages that satisfy the message aggregate characteristic; and
   selecting a predetermined number of the published messages according to a message scoring system.

5. The method of claim 1, wherein providing the indication of the published message further comprises automatically pushing the published message to the user via an electronic delivery system, and wherein the message aggregate characteristic describes a frequency of a topic activity within a geographical area.

6. The method of claim 1, wherein providing the indication of the published message further comprises providing the published message in response to receiving a pull request from the user.

7. The method of claim 1, wherein the message aggregate characteristic comprises a post-publication aspect of an aggregate of messages, wherein the post-publication aspect corresponds to data that is collected for the aggregate of messages after the aggregate of messages is published.

8. The method of claim 1, wherein the message aggregate characteristic comprises an indication of an emotional aspect of the published message, wherein the emotional aspect is determined by using a text analysis process.

9. The method of claim 1, wherein the message aggregate characteristic comprises a demographic among which the published message has a subscription volume above a subscription threshold.

10. The method of claim 1, wherein the message aggregate characteristic comprises an indication of an aspect of a published message to exclude from the message subscription.

11. The method of claim 1, the method further comprising extracting the message aggregate characteristic from the message subscription.

\* \* \* \* \*